(No Model.)
G. L. TINKER.
QUEEN REARING CHAMBER.
No. 406,972. Patented July 16, 1889.
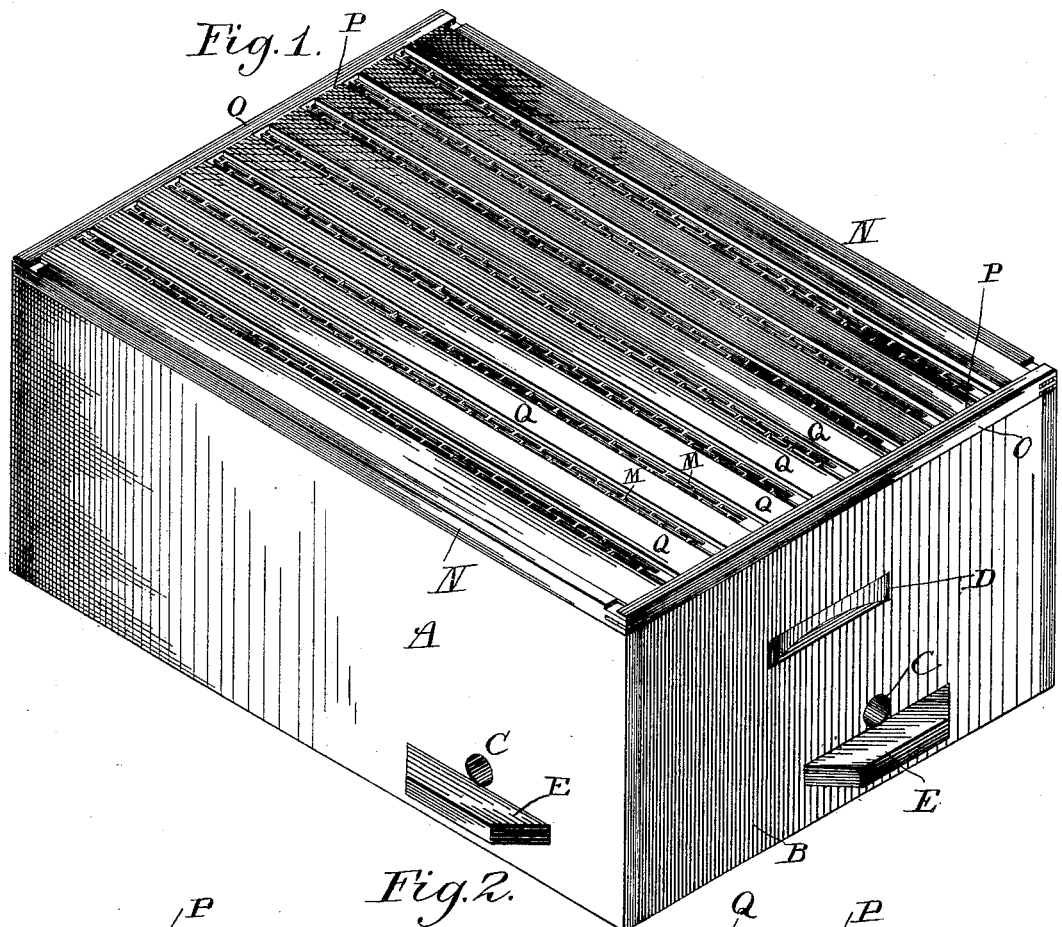
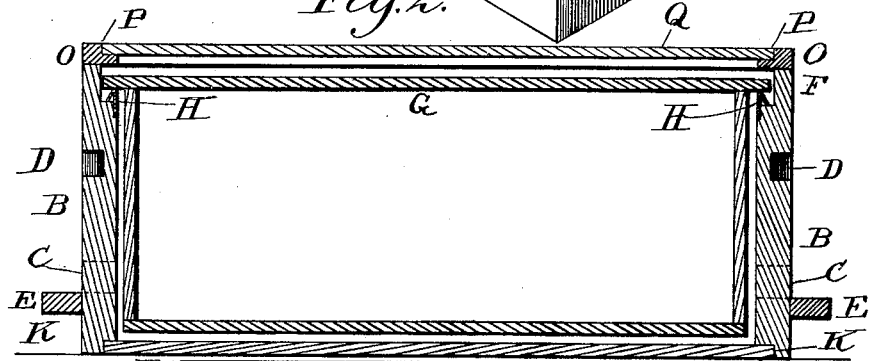
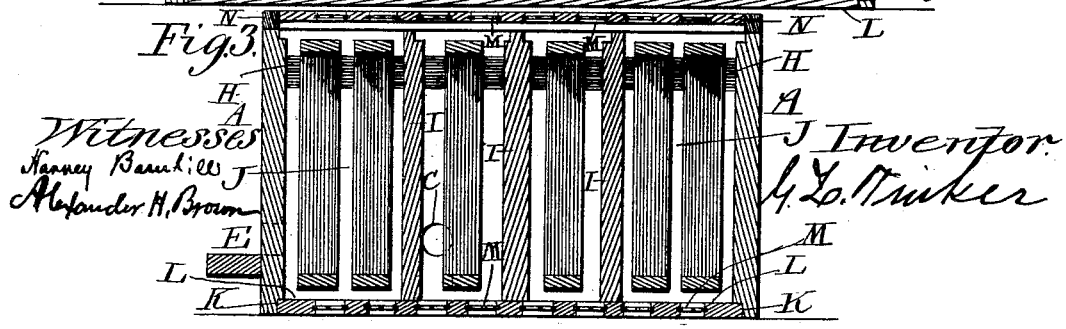

UNITED STATES PATENT OFFICE.

GEORGE LYMAN TINKER, OF NEW PHILADELPHIA, ASSIGNOR OF ONE-HALF TO WINFIELD S. KLINE, OF BOLIVAR, OHIO.

QUEEN-REARING CHAMBER.

SPECIFICATION forming part of Letters Patent No. 406,972, dated July 16, 1889.

Application filed February 11, 1889. Serial No. 300,637. (No model.)

*To all whom it may concern:*

Be it known that I, GEORGE LYMAN TINKER, a citizen of the United States, residing at New Philadelphia, in the county of Tuscarawas and State of Ohio, have invented a new and useful Queen-Rearing Chamber, of which the following is a full, clear, and exact description, which will enable others skilled in the art to which it appertains to make and use the same.

The object of this invention is to facilitate the rearing of queen bees. Heretofore queens have been reared in small or nucleus colonies, or in full colonies of bees, only one queen being reared in a colony at one and the same time. By my invention a number of queens can be reared in every full colony of bees at one and the same time.

Queen bees are natural enemies of each other, the strongest and most active always killing her rivals, if the opportunity presents, by stinging them. Hence, if more than one queen is sought to be kept in a colony of bees they must be kept apart by suitable means. By the use of perforated metal queen-excluding sheets, queen-cells or combs of brood may be safely hatched in as many apartments of a hive as there may be cells and combs of brood, one cell being put in each of the apartments, the said sheet metal being arranged between the apartments and provided with perforations of such size as to freely admit the worker bees to all of the said apartments, so that the brood may be protected and cared for. That the young queens so hatched may mate and become serviceable, it is required that the said sheet metal be so placed that they cannot come in contact with each other, so as to quarrel and involve the worker bees in the conflict. To prevent the queens from coming in contact with each other, there must be provided intervening spaces of not less than three-eighths of an inch on all of the sides of the apartments where the said sheet metal is used. The other side or sides of the apartments may be of wood or any material to keep the queens apart. It is further required that each of the apartments shall have a hole or opening to the outside of the hive, so that the young queens may fly out to meet the drone bees. To enable each of the queens to return to the holes from which they came, the part of the hive about the holes is painted a different color, or twigs of leaves or other objects may be suspended near the holes for the same purpose.

The invention found to be the most serviceable for the purposes set forth is illustrated in the accompanying drawings, in which—

Figure 1 is a perspective view of the same with holes on each of the sides, there being one opening for each of the apartments. This figure represents a brood-chamber of a hive having partitions within and queen-excluding metal on the bottom. On the top is shown a queen-excluding honey-board, that is used in connection with the other parts of the device. Fig. 2 is a vertical section of the same, and Fig. 3 is a vertical section of the same. In each of the figures the honey-board is shown in an inverted position.

Similar letters refer to similar parts throughout the several views.

The device consists of a frame of suitable dimensions, and is constructed of the sides A and the ends B, in each of which is made a hole C, opening into a separate apartment within. The ends are recessed at D, to facilitate handling. Alighting-boards E are attached below the holes, as shown. The ends B are rabbeted at the upper and inner edge at F, to receive the ends of the brood-frames G. Attached to the inner surface of the ends B, and resting in the rabbets F, are strips of bent tin H, (shown in Fig. 2,) to support the projecting ends of the top bars of the brood-frames.

The partitions I, forming the apartments J J, are shown in Fig. 3. They come even with the top of the frame, whereby a bee-space is left above the tops of the brood-frames in each of the apartments. They are rabbeted on the upper edges, as shown, to limit the extent of the propolizing where they come in contact with the slats of the honey-board. If one or more queen-rearing supers are to be placed on a hive, one above the other, a queen-excluding honey-board is required between each one of them. The ends B and sides A are rabbeted at the lower and inner edges, at K K, to receive the slats L L, as shown. They are arranged longitudinally with the partitions, and the slats coming beneath the partitions are attached thereto. The slats L have saw-kerfs in their adjacent edges, to receive the strips of perforated sheet metal M M.

The queen-excluding honey-board shown at the top of the super in each of the figures consists of a frame with sides N and ends O, and they are dovetailed at the corners, as shown. The ends O are rabbeted at P to receive the ends of the slats Q Q, which are made with saw-kerfs in their adjacent edges to receive the strips of perforated sheet metal M M.

The queen-rearing chamber is used as follows: Brood-combs having queen-cells constructed on them in any colony of bees may be set over into the chamber, and it may be then used in place of the regular brood-chamber, the queen-excluding honey-board being placed on the top, and then the supers of the hive, and lastly the cover; or the honey-board may first be placed on a brood-chamber of a colony of bees, and then the extracting or section supers, and lastly the queen-rearing chamber and the cover of the hive. In the latter case the combs of brood having the queen-cells may be taken from any other hive (but without any of the bees of the other hive) and set in the queen-rearing chamber, when, as in the first case, the cells will hatch in due time and the queens will become fertile.

Having fully described my invention, what I claim, and desire to secure by Letters Patent, is—

A queen-rearing chamber consisting of a rectangular box having a solid vertical partition dividing the box into compartments, said box having queen-bee openings leading to each compartment, supports in each compartment for suspending a comb-frame, a comb-frame on such supports, and a top and bottom each consisting of a series of longitudinal slats spaced apart, having in their edges saw-kerfs carrying narrow strips of perforated metal, substantially as and for the purpose set forth.

GEORGE LYMAN TINKER.

In presence of—
  HARVEY BARNHILL,
  ALEXANDER H. BROWN.

It is hereby certified that in Letters Patent No. 406,972, granted July 16, 1889, upon the application of George Lyman Tinker, of New Philadelphia, Ohio, for an improvement in "Queen-Rearing Chambers," was erroneously issued to said "Tinker and Winfield S. Kline," of Bolivar, Ohio, as joint owners of the invention, whereas said Letters Patent should have been issued to said *George Lyman Tinker* as sole owner of said invention; and that said Letters Patent should be read with this correction therein that the same may conform to the record of the case in the Patent Office.

Signed, countersigned, and sealed this 30th day of July, A. D. 1889.

[SEAL.]

CYRUS BUSSEY,
*Assistant Secretary of the Interior.*

Countersigned:

C. E. MITCHELL,
*Commissioner of Patents.*